Dec. 6, 1949     G. BOENER     2,490,250
PROTECTIVE COVER FOR PRESSURE COOKERS
Filed Feb. 20, 1947
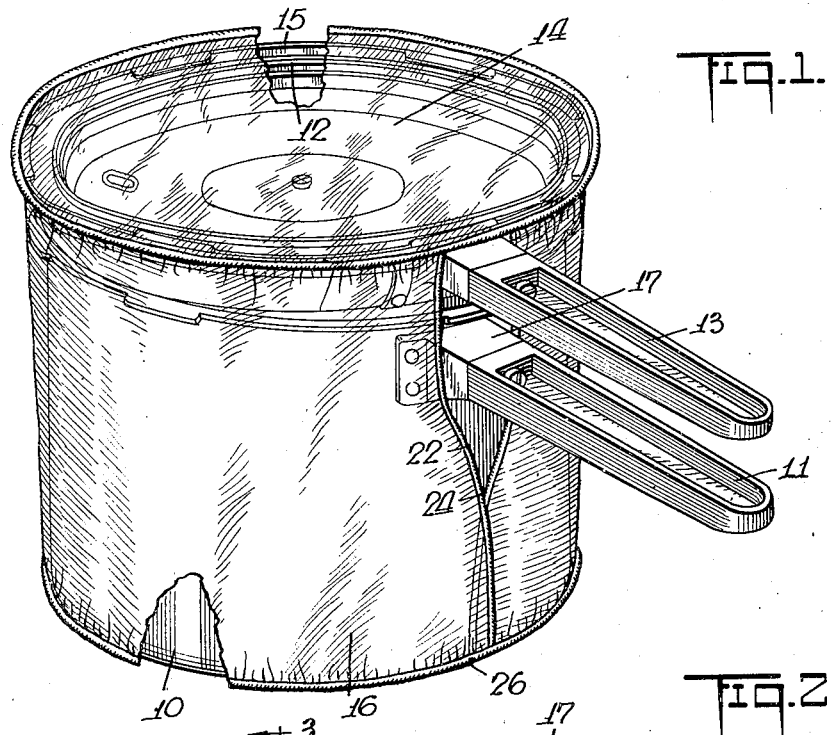
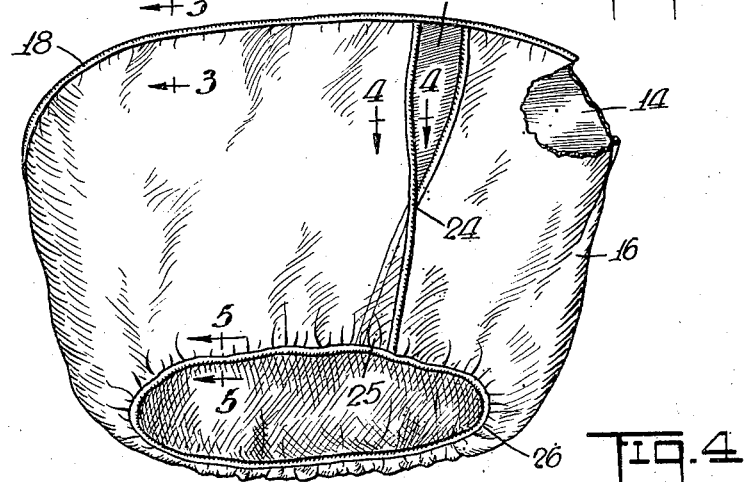
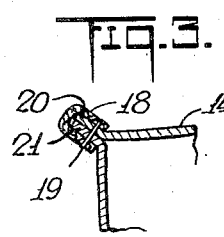
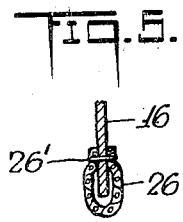
INVENTOR
*Gladys Boener*
BY
*Dean Fairbank & Hirsch*
ATTORNEYS Patented Dec. 6, 1949

2,490,250

UNITED STATES PATENT OFFICE 2,490,250

PROTECTIVE COVER FOR PRESSURE COOKERS

Gladys Boener, New York, N. Y., assignor to Seal-Sac, Inc., New York, N. Y., a corporation of New York Application February 20, 1947, Serial No. 729,799

1 Claim. (Cl. 150—52)

As conducive to a clear understanding of the present invention, it is noted that after use and cleaning of a domestic pressure cooker the lid thereof is to be laid upon the cooker in inverted position to afford a ventilating gap, since unpleasant odors might develop in the cooker if the cover were hermetically sealed after use. With the cover in such inverted position, dust is however apt to accumulate upon the inner face thereof which necessitates washing before use.

It is an object of the present invention to guard the lid when placed in the prescribed inverted position upon the cooker after use, against the accumulation of dust and thus to dispense with the need for washing the same before re-use and to accomplish this result by a simple inexpensive flexible cover member that is readily applied and is readily removed without the need for any particular skill, which is attractive in appearance, inherently durable and easily kept clean.

In the accompanying drawings in which is shown one of the various possible embodiments of the several features of the invention, Fig. 1 is a perspective view showing the pressure cooker with the protective cover in place thereon;

Fig. 2 is a perspective view of the protective cover as an article of manufacture apart from the pressure cooker;

Fig. 3 is a fragmentary sectional view on a larger scale, taken on line 3—3 of Fig. 2;

Fig. 4 is a view similar to Fig. 3 taken on line 4—4 of Fig. 2, and

Fig. 5 is a view similar to Figs. 3 and 4 taken on line 5—5 of Fig. 2.

The pressure cooker illustratively shown is of conventional construction and comprises a deep pot 10 with a handle 11 affixed thereto and extending radially outward therefrom. The lid 12 is domed, as shown, and has a similar radially extending handle 13. The lid after use of the cooker is laid as shown, in inverted position, that is with its concavity uppermost upon the rim of the cooker proper so that there remains a ventilating space between the cooker and its lid.

The protective cover as applied to the cooker according to the present invention, comprises a crown piece 14 snugly lying at its rim against the upturned rim 15 of the inverted lid 12 and has unitary therewith a side wall member 16 desirably extending the entire height of the pressure cooker, as shown in Fig. 1, and embracing the floor of said cooker at its lower edge. The cover also provides a port 17 through which the two handle members 11 and 13 protrude.

In a preferred construction the cover is of substantially waterproof, dustproof, non-toxic, acid and stain resistant flexible synthetic filming material, preferably translucent, which may be of latex, but is preferably of any of various synthetic rubber compositions now available on the market. The cover comprises the crown piece 14 which is circular and the side wall member 16 made of a rectangular strip of length slightly less than the periphery of the crown piece to afford the gap 17 and of width substantially equal to the overall height of the cooker pot with its lid inverted and in place thereon. The side wall member 16 is preferably secured about the periphery of crown piece 14, as shown in Fig. 2, by means of a binder 18 embracing the edges of and stitched as at 19 to the outturned rim 20 of crown piece 14 and the border 21 of side wall member 16. Preferably the length of the side wall member is less than the peripheral length of the crown to the extent of about 20 degrees of arc of the latter, to afford the gap 17 between the ends of said side wall strip at the upper or crown edge thereof. The end edges of the side wall strip 16 are preferably provided each with a selvage binding 22 of relatively non-elastic fabric stitched thereto as at 23 and said selvages extend in close contiguity with each other at the lower edge of the cover as shown. The lower peripheral edge of the side wall member has a selvage 26 thereabout, preferably in the form of an elastic binder, the relaxed length of which is in the order of one-half the peripheral length of the crown and stitched about the lower edge of the side wall member 16, as shown at 26'.

The cover, it will be seen, is easily made from the two pieces of flexible film material, i. e., the circular crown piece 14 and the rectangular side wall strip 16. In assembly the end bindings 22 are first stitched to the extremities of the side wall strip 16. Thereupon the crown binding 18 is stitched along the entire length of the upper edge of the side piece and about the entire periphery of the crown piece, leaving the gap 17, since the side wall strip is not of length sufficient completely to encompass the crown piece. With the lower edges of the extremities of the side wall strip 16 slightly overlapped, as shown at 25, the elastic binder strip 26 is now stitched about the lower rim of the side wall member to form a bottom opening which, in the relaxed position shown and by reason of the shorter length above described of said elastic binder 26, is of diameter and circumference in the order of one-half the diameter and circumference respectively of the crown binding, the excess material at the lower end of the side wall becoming puckered adjacent the lower rim in manner best shown in Fig. 2. The bound end edges of the rectangular side wall strip thereby slope downward from the crown toward each other, crossing each other as at 24 near but above the bottom to afford the completely closed elastically bound lower edge of the cover.

In use, the gap 17 defined between the end binders 22 of the side wall member is passed over the ends of the superposed handles 11 and 13 and thereupon the elastic binder 26 at the lower rim of the cover is stretched and passed over the lid 12 and the cooker proper 10 and is pulled downward to the bottom of the cooker.

When in place on the cooker, the stretched elastic band 26 distends the puckered lower edge of the side wall 16 to its full length, firmly and resiliently to embrace the side wall of the cooker about its bottom, and frictionally to hold the cover in place with the crown 14 drawn taut across the entire periphery of the upstanding rim 15 of the inverted lid 12 and with the non-elastic binder 18 encompassing the rim of said lid. Moreover, the lateral binders 22 flank and engage the lateral edges of the protruding handles 11 and 13. Accordingly the lid is adequately protected against the settling of dust thereon. For use of the pressure cooker, the cover would be removed by drawing the same upward from the cooker pot and drawing the same off the length of the handles 11 and 13 in manner that is obvious.

As many changes could be made in the above construction and many apparently widely different embodiments of this invention could be made without departing from the scope of the claim, it is intended that all matter contained in the above description or shown in the accompanying drawings shall be interpreted as illustrative and not in a limiting sense.

Having thus described my invention what I claim as new and desire to secure by Letters Patent of the United States is:

A protective cover of plastic material for encompassing the side wall of a pressure cooker and covering the lid of such cooker when laid in inverted position over the latter and with the handles of the cooker and the lid protruding outwardly therefrom, said cover comprising a circular crown member to extend over the inverted cover, a flexible side wall member, a binder of substantially inelastic material peripherally about the crown and the upper edge of the side wall to attach said members together with a gap between the upper ends of the side wall member of length in the order of 20 degrees of arc of the crown, said side wall being of substantially the overall height of the pressure cooker with its inverted cover thereon, the ends of said side wall member being contiguous to each other at the lower edge thereof, said ends of the side wall having selvages of substantially inelastic material and crossing between the upper and lower edges of the side wall member for overlapping of the ends thereof near the lower edge of the cover, the lower edge of the side wall member having an elastic binder extending completely therearound to connect said contiguous ends together, whereby said binder may embrace the lower part of the cooker with the handles protruding through said gap from between the lateral edges of the side wall.

GLADYS BOENER.

REFERENCES CITED

The following references are of record in the file of this patent:

UNITED STATES PATENTS

| Number | Name | Date |
|---|---|---|
| 1,084,719 | Wanamaker | Jan. 20, 1914 |
| 1,535,312 | Hosking | Apr. 28, 1925 |
| 2,028,454 | Johnson | Jan. 21, 1936 |
| 2,035,384 | Hinchliff | Mar. 24, 1936 |
| 2,080,108 | Brandstein | May 11, 1937 |
| 2,336,950 | Moss | Dec. 14, 1943 |
| 2,432,662 | Gardner | Dec. 16, 1947 |